(12) United States Patent
Miyamoto

(10) Patent No.: US 9,234,579 B2
(45) Date of Patent: Jan. 12, 2016

(54) CONTROL DEVICE AND CONTROL METHOD FOR VEHICULAR ELECTRIC OIL PUMP

(71) Applicant: Hitachi Automotive Systems, Ltd., Hitachinaka-shi, Ibaraki (JP)

(72) Inventor: Shogo Miyamoto, Isesaki (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 0 days.

(21) Appl. No.: 14/429,201

(22) PCT Filed: Sep. 17, 2013

(86) PCT No.: PCT/JP2013/075044
§ 371 (c)(1),
(2) Date: Mar. 18, 2015

(87) PCT Pub. No.: WO2014/046091
PCT Pub. Date: Mar. 27, 2014

(65) Prior Publication Data
US 2015/0226319 A1 Aug. 13, 2015

(30) Foreign Application Priority Data
Sep. 20, 2012 (JP) ................. 2012-206645

(51) Int. Cl.
*F16H 61/00* (2006.01)
*F16H 57/04* (2010.01)
*F16H 59/74* (2006.01)

(52) U.S. Cl.
CPC ........ *F16H 61/0031* (2013.01); *F16H 57/0413* (2013.01); *F16H 59/74* (2013.01)

(58) Field of Classification Search
None
See application file for complete search history.

(56) References Cited

U.S. PATENT DOCUMENTS

| | | | |
|---|---|---|---|
| 2005/0178622 A1* | 8/2005 | Blue | B60T 8/1708 188/71.1 |
| 2010/0038883 A1* | 2/2010 | Thedford | B60P 3/07 280/490.1 |
| 2011/0034299 A1* | 2/2011 | Nakamura | F16H 61/0031 477/167 |
| 2011/0077828 A1 | 3/2011 | Matsuda et al. | |
| 2011/0168494 A1* | 7/2011 | Subramaniam | F03D 11/0008 184/6.12 |

FOREIGN PATENT DOCUMENTS

| JP | 2001-58518 A | 3/2001 |
|---|---|---|
| JP | 2001-165287 A | 6/2001 |
| JP | 2009-293649 A | 12/2009 |

OTHER PUBLICATIONS

International Search Report (PCT/ISA/210) dated Dec. 24, 2013 with English translation (three pages).

(Continued)

*Primary Examiner* — Edwin A Young
(74) *Attorney, Agent, or Firm* — Crowell & Moring LLP

(57) ABSTRACT

The invention relates to a control device and a control method for a vehicular electric oil pump that supplies oil to a power transmission device transmitting power to an axle. When a vehicle speed exceeds a predetermined value in a non-drive state of the power transmission device, the control device calculates a target rotational speed of the electric oil pump based on an oil temperature and drives the electric oil pump. Accordingly, it is possible to reduce insufficient lubrication and an increase in temperature of the power transmission device when the vehicle is towed.

11 Claims, 8 Drawing Sheets

(56) References Cited

OTHER PUBLICATIONS

English translation of International Preliminary Report on Patentability (PCT/IPEA/409) dated Feb. 12, 2015 (six pages).

Japanese Office Action issued in counterpart Japanese Application No. 2012-206645 dated Nov. 10, 2015 with English-language translation (five (5) pages).

* cited by examiner

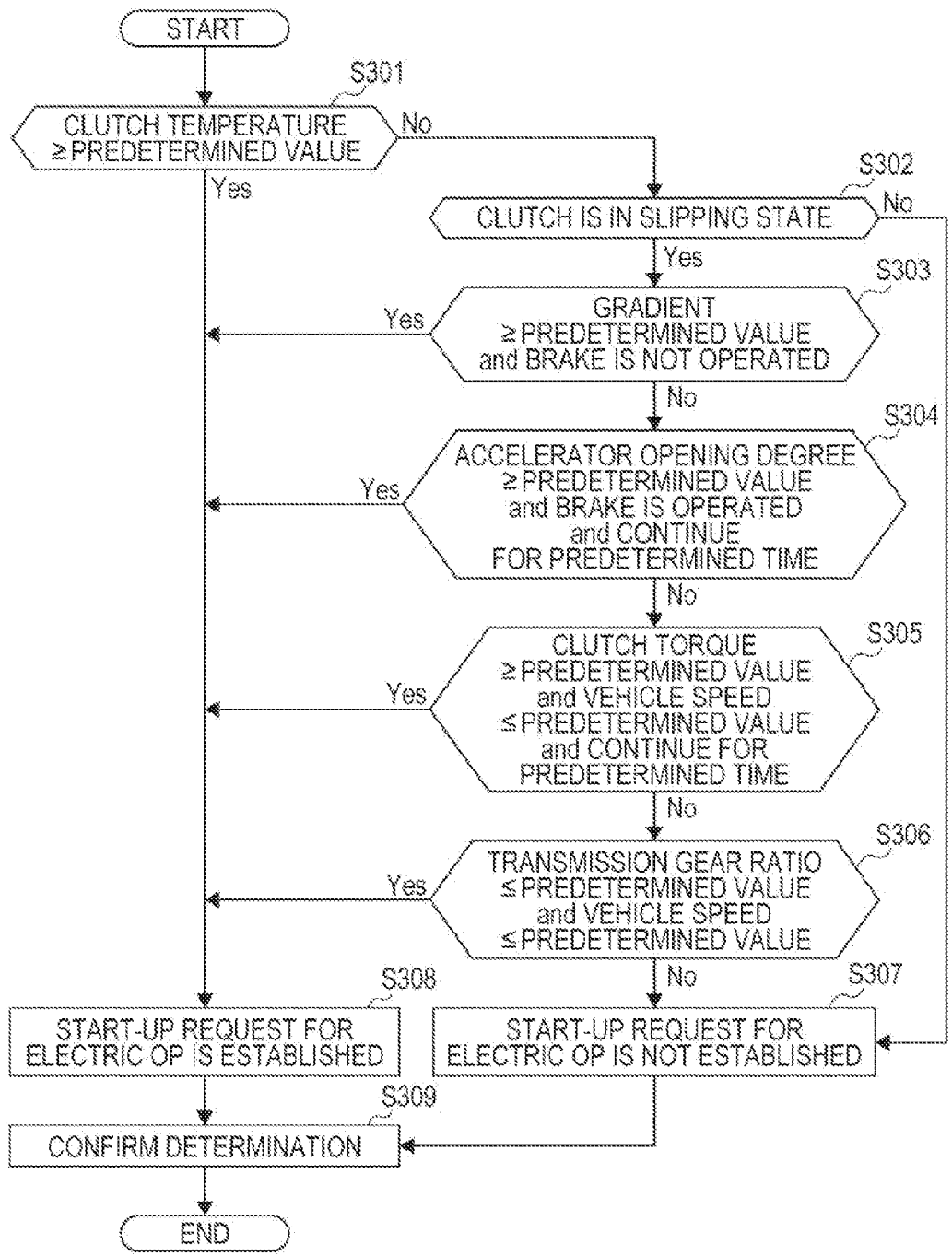

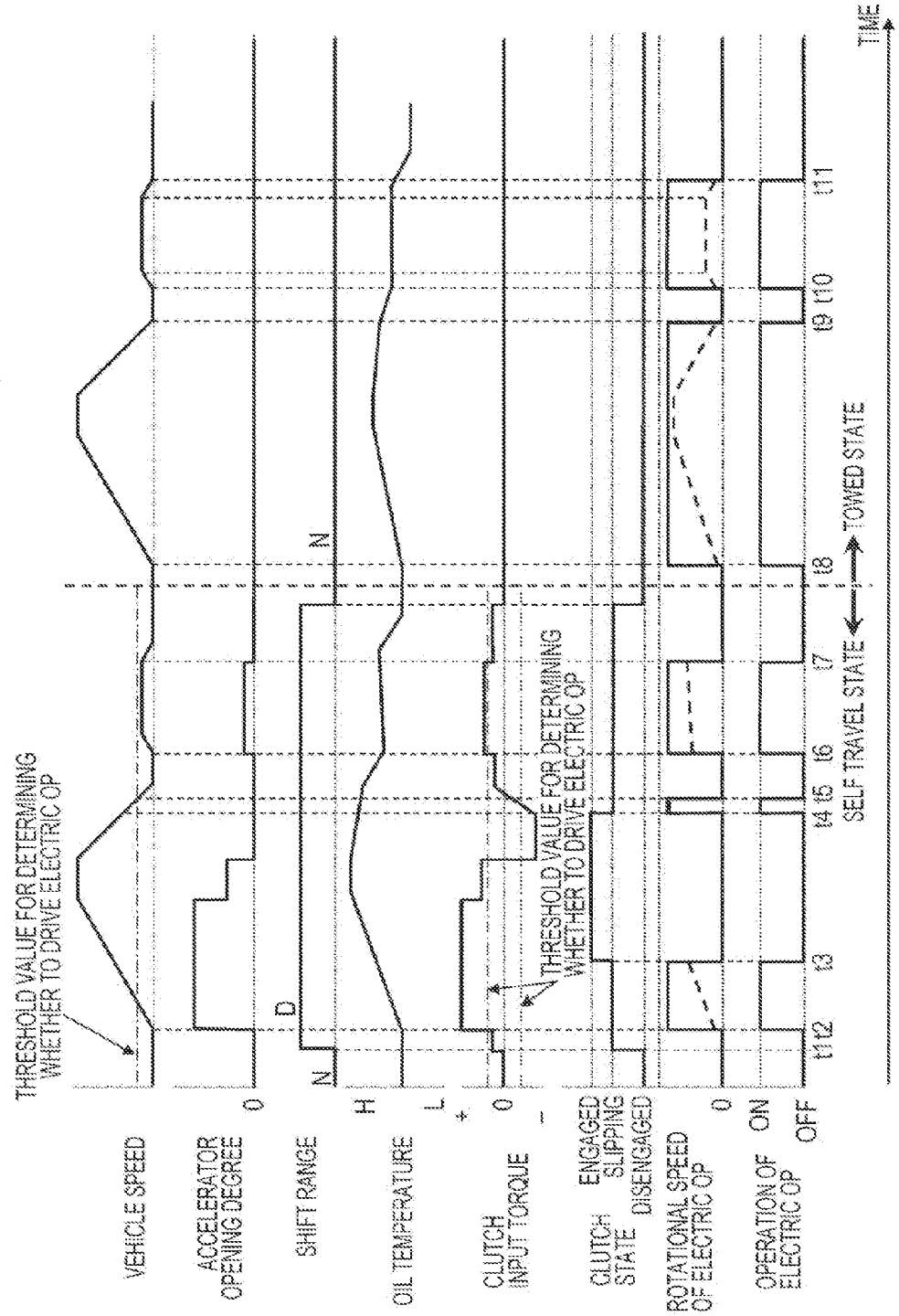

CONTROL DEVICE AND CONTROL METHOD FOR VEHICULAR ELECTRIC OIL PUMP

TECHNICAL FIELD

The present invention relates to a control device and a control method for a vehicular electric oil pump that supplies oil to a power transmission device that transmits power to an axle.

BACKGROUND ART

Patent Document 1 discloses a technique in which a mechanical oil pump driven by an engine and an electric oil pump driven by a motor are provided as pumps that supply oil to a power transmission device connected to the engine, and the electric oil pump is driven when the engine is automatically stopped, and accordingly, the mechanical oil pump is stopped.

Furthermore, the power transmission device is, for example, a transmission mechanism or a start friction element.

REFERENCE DOCUMENT LIST

Patent Document

Patent Document 1: Japanese Patent Application Laid-open Publication No. 2009-293649

SUMMARY OF THE INVENTION

Problems to be Solved by the Invention

When a vehicle is towed, the engine of the towed vehicle is stopped and a power transmission device is set to a non-drive state. Accordingly, a mechanical oil pump is stopped.

However, since a mechanical component of the power transmission device is rotationally driven from the axle side in the towed state, there is a possibility that the lubrication may not be satisfactory or a temperature may increase in a clutch or the like of the power transmission device while the supply of oil to the power transmission device is interrupted.

The invention is made in view of the these problems, and an object thereof is to provide a control device and a control method for a vehicular electric oil pump capable of reducing insufficient lubrication or an increase in temperature in a power transmission device when a vehicle is towed.

Means for Solving the Problems

For that reason, in the control device according to the present invention, an operation time of the vehicular electric oil pump is shortened as an oil temperature decreases when the vehicular electric oil pump is operated while the vehicle is in a towed state. Furthermore, the control method according to the present invention includes the steps of determining whether the vehicle is in a towed state; and shortening the operation time of the vehicular electric oil pump as the oil temperature decreases when the vehicular electric oil pump is operated while the vehicle is in the towed state.

Effects of the Invention

According to the invention, it is possible to reduce the insufficient lubrication and the increase in temperature of the power transmission device while reducing the battery consumption while the vehicle is in the towed state.

BRIEF DESCRIPTION OF THE DRAWINGS

FIG. 4 is a flowchart illustrating a determination on whether to drive the electric oil pump in the drive state of the power transmission device according to the embodiment of the invention.

FIGS. 6A and 6B are timing diagrams illustrating a difference in control pattern of the electric oil pump between the drive state and the non-drive state of the power transmission device according to the embodiment of the invention, in relation to a vehicle speed, an accelerator opening degree, a clutch input torque, and the like.

MODE FOR CARRYING OUT THE INVENTION

Hereinafter, an embodiment of the invention will be described.

An example of a control device for a vehicular electric oil pump which is applied to a hybrid vehicle will be described as an example according to the invention with reference to the drawings.

Figure 1:
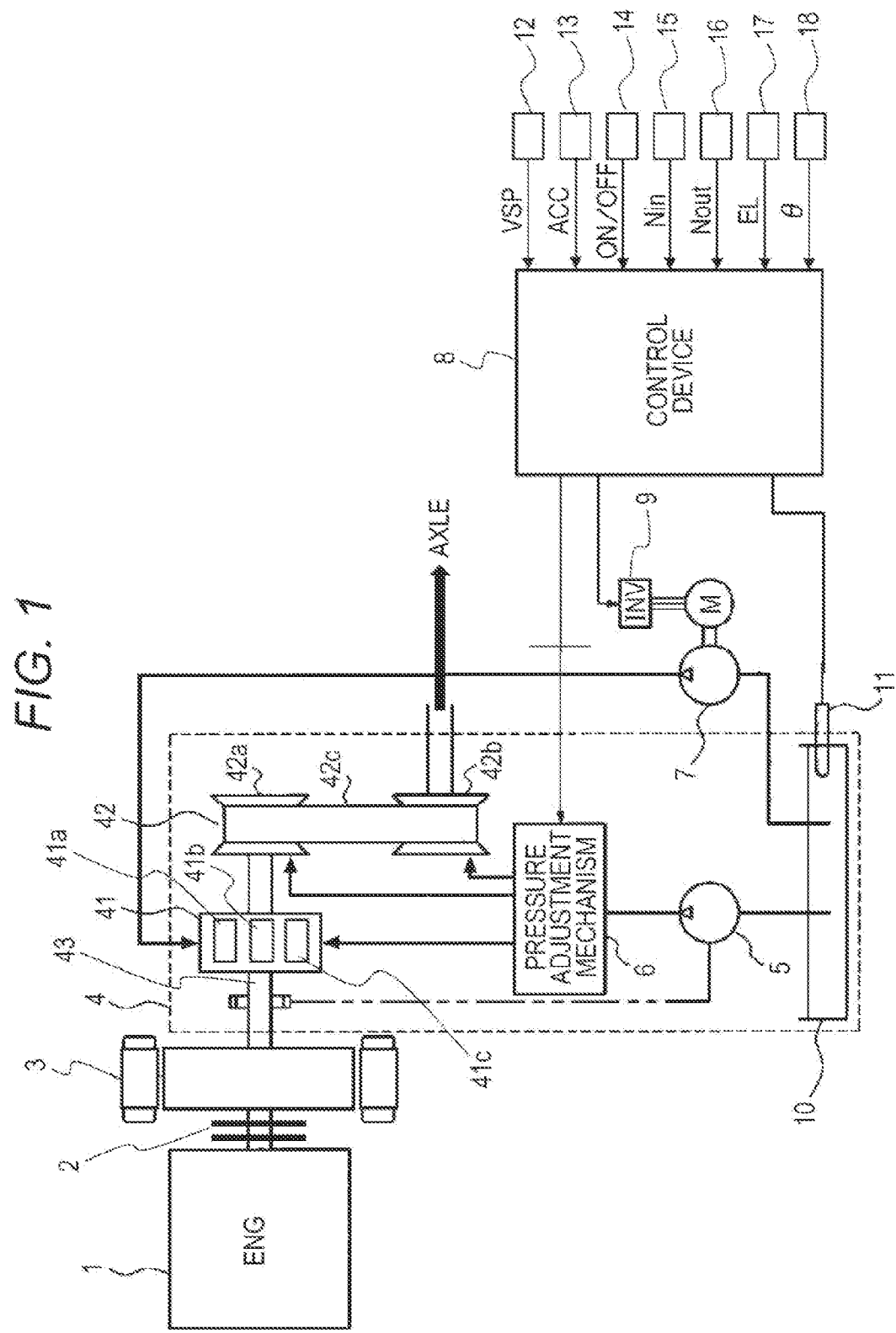
FIG. 1 is a diagram illustrating a drive system for a hybrid vehicle according to an embodiment of the invention.

FIG. 1 illustrates a drive system for a hybrid vehicle, and the drive system includes an engine 1 as an internal combustion engine, a first clutch 2, a motor generator 3, and a power transmission device 4. Here, an output of power transmission device 4 is transmitted to an axle (not illustrated).

Power transmission mechanism 4 includes a forward-reverse switching mechanism 41 including a planetary gear mechanism 41a, a reverse brake 41b, and a forward clutch (second clutch) 41c, and a continuously variable transmission mechanism 42.

Continuously variable transmission mechanism 42 includes a primary pulley 42a, a secondary pulley 42b, and a V-belt 42c, which is wrapped around the pulleys. The rotation of primary pulley 42a is transmitted to secondary pulley 42b through V-belt 42c, and the rotation of secondary pulley 42b is transmitted to the axle (not illustrated), thereby driving the vehicle.

When a movable conical plate of primary pulley 42a and a movable conical plate of secondary pulley 42b are moved in the axial direction so as to change the radius of the contact position with respect to V-belt 42c, a rotation ratio, that is, a transmission gear ratio, between primary pulley 42a and secondary pulley 42b can be changed.

Furthermore, a mechanical oil pump 5, which is driven by a rotation shaft 43 between motor generator 3 and forward-reverse switching mechanism 41 is provided, and an oil which is discharged by mechanical oil pump 5 rotationally driven by engine 1 and/or motor generator 3 is supplied for the oil operation purpose, the lubricating purpose, and the cooling purpose to forward-reverse switching mechanism 41 and continuously variable transmission mechanism 42 through a pressure adjustment mechanism 6.

In addition, electric oil pump 7 is provided in parallel to mechanical oil pump 5, and an oil which is discharged from electric oil pump 7 is supplied for the lubricating purpose and the cooling purpose to forward-reverse switching mechanism 41.

The operations of pressure adjustment mechanism 6 and electric oil pump 7 are controlled by a control device 8 having a computer. Control device 8 controls the operation of electric oil pump 7 through a control of an inverter 9.

The drive system for the hybrid vehicle has two drive modes, that is, a hybrid drive mode in which first clutch 2 is engaged so that engine 1 and motor generator 3 are used as a power source to drive the vehicle, and an electric vehicle drive mode in which first clutch 2 is disengaged so that only the motor generator MG is used as the power source to drive the vehicle.

Output signals of various sensors that detect the state of the drive system are input to control device 8.

As various sensors, provided are a temperature sensor 11 that measures an oil temperature TO inside an oil pan 10 that stores oil circulated by mechanical oil pump 5 and electric oil pump 7, a vehicle speed sensor 12 that measures a vehicle speed VSP, an accelerator opening degree sensor 13 that measures an opening degree ACC of an accelerator operated by a driver, a brake switch 14 that detects the operation of the brake, an input rotation sensor 15 that measures an input side rotational speed Nin of forward-reverse switching mechanism 41, an output rotation sensor 16 that measures an output side rotational speed Nout of forward-reverse switching mechanism 41, a target drive force sensor 17 that obtains a target drive force EL of engine 1, a gradient sensor 18 that measures a gradient A of a road surface, on which the vehicle travels, and the like.

Next, an example of a control of electric oil pump 7 using control device 8 will be described with reference to the flowcharts of FIGS. 2 to 4.

Figure 2:
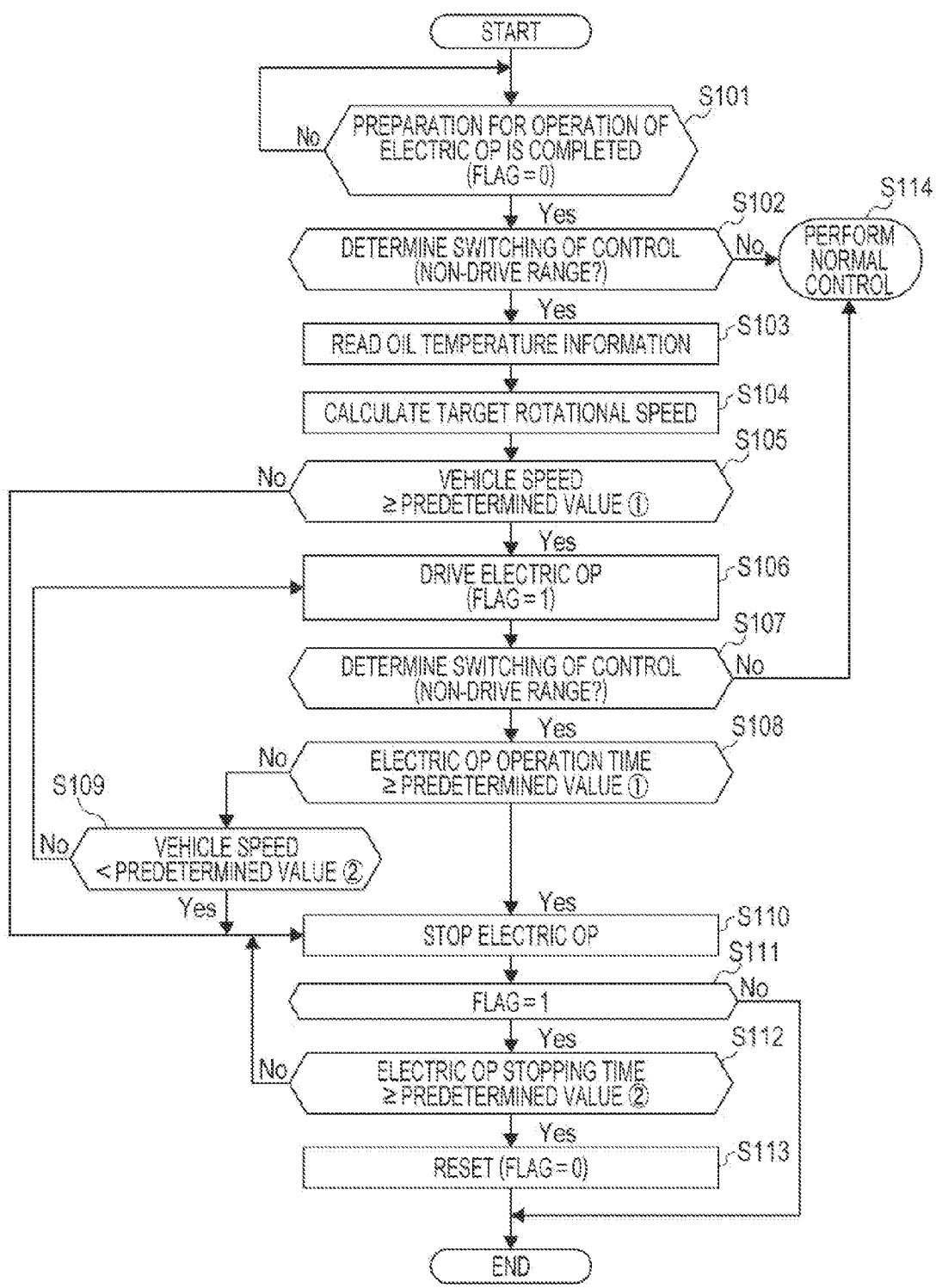
FIG. 2 is a flowchart illustrating a control of an electric oil pump in a non-drive state of a power transmission device according to the embodiment of the invention.

The routine illustrated in the flowchart of FIG. 2 is performed by control device 8 while a start switch of the vehicle is turned on and electric power is input to control device 8.

First, in step S101, control device 8 determines whether the preparation for the operation of electric oil pump 7 has been completed and performs a reset process of setting a flag to zero.

The completion of the preparation for the operation of electric oil pump 7 indicates, for example, a state in which a relay that supplies electric power to the motor of electric oil pump 7 is turned on, a battery voltage as a power supply voltage of the motor is within a specific range, and the failure of electric oil pump 7 or inverter 9 is not diagnosed in a failure diagnosis.

When the preparation for the operation of electric oil pump 7 has been completed, in other words, when electric oil pump 7 is ready for operation, the routine of control device 8 proceeds to step S102.

In step S102, control device 8 determines whether forward-reverse switching mechanism 41 of power transmission mechanism 4 is in the drive state in which power is transmitted or the non-drive state in which power is not transmitted.

The state whether forward-reverse switching mechanism 41 is the drive state or the non-drive state can be determined from a state of a range selected by an AT selector. Here, control device 8 determines that the state at that time is the non-drive state when the range is a neutral range, and determines that the state at that time is the drive state when the range is the other drive ranges.

Here, when it is determined that forward-reverse switching mechanism 41 is in the drive state, control device 8 performs a start-up control in step S114.

An example of the start-up control of step S114, that is, the control pattern of the drive state will be described with reference to the flowcharts of FIGS. 3 and 4.

Figure 3:
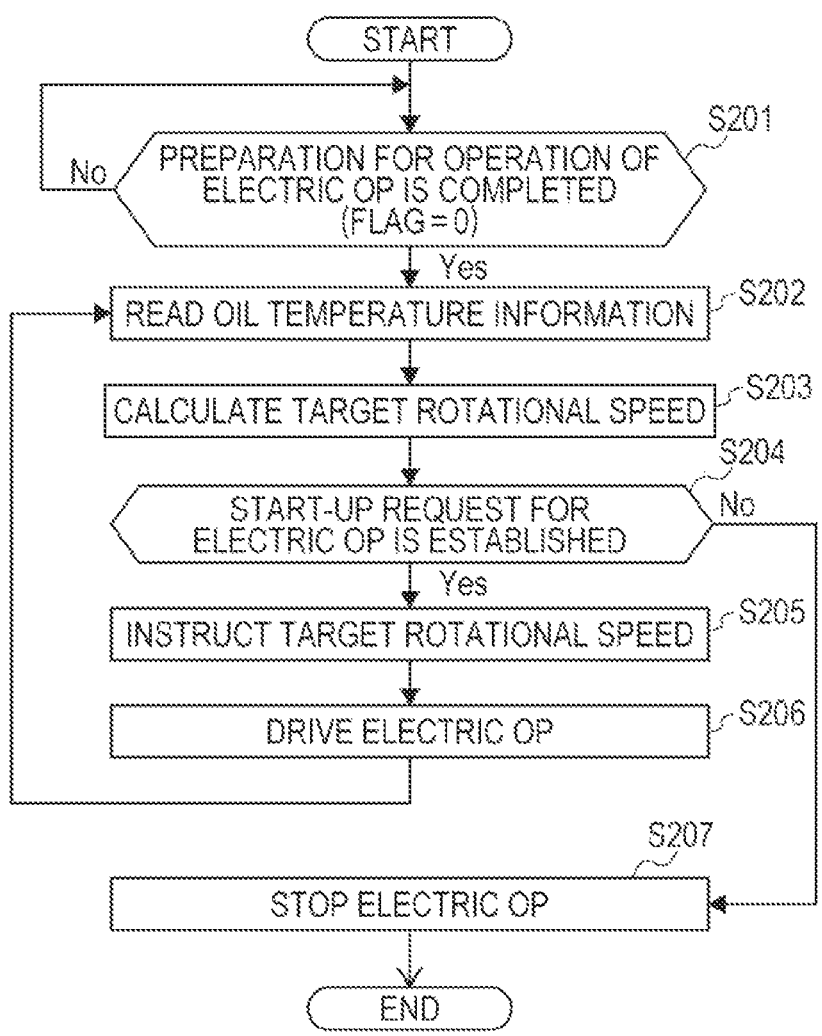
FIG. 3 is a flowchart illustrating a control of the electric oil pump in a drive state of the power transmission device according to the embodiment of the invention.

In step S201 of the flowchart of FIG. 3, control device 8 determines whether the preparation for the operation of electric oil pump 7 has been completed, similarly to step S101. When the preparation for the operation has been completed, the routine proceeds to step S202.

In step S202, control device 8 reads an oil temperature TO (° C.) measured by temperature sensor 11. In next step S203, control device 8 calculates a target rotational speed rpm (target flow rate L/min) of electric oil pump 7 based on the oil temperature TO.

In control device 8, a conversion table or a function, representing a correlation between the oil temperature TO and the target rotational speed rpm used in the drive state of forward-reverse switching mechanism 41, is set. Thus, control device 8 calculates the target rotational speed rpm, in other words, the target flow rate L/min, based on the measured value of the oil temperature TO, according to the correlation.

The target rotational speed rpm is set to a higher rotational speed as the oil temperature TO increases. When the oil temperature is high, the oil flow rate is increased to improve the cooling performance, and hence an increase in oil temperature TO is reduced.

However, the invention is not limited to the configuration in which the target rotational speed rpm of electric oil pump 7 is changed in response to the oil temperature TO. For example, the target rotational speed rpm may be set to a constant value regardless of the oil temperature TO.

In step S204, control device 8 determines whether a start-up request for electric oil pump 7 is established. The start-up request for electric oil pump 7 indicates a request for compensating an insufficient oil flow rate by electric oil pump 7 in a state in which mechanical oil pump 5 is driven and the oil is circulated by mechanical oil pump 5.

As an example, the total oil flow rate is increased by adding the oil discharged from electric oil pump 7 to the oil discharged from mechanical oil pump 5 in order to cope with the generation of heat in the slipping state of forward clutch 41$c$, that is, a friction-engagement component, such as a multi-plate wet clutch.

In other words, in a state in which forward clutch 41$c$ generates a small amount of heat, that is, in a disengaged state or a completely engaged state without any slip, the oil flow rate necessary for the lubrication and the cooling can be ensured by the oil discharged from mechanical oil pump 5. Thus, when the flow rate of the oil discharged from mechanical oil pump 5 does not satisfy the necessary oil flow rate due to the heat generated by the slip of forward clutch 41$c$, electric oil pump 7 is driven so that the necessary oil flow rate is ensured.

As an example, whether the start-up request for electric oil pump 7 is established is determined in step S204 by control device 8 as illustrated in the flowchart of FIG. 4.

In step S301 of the flowchart of FIG. 4, control device 8 determines whether the temperature of forward clutch 41c is a predetermined value or higher.

The temperature of forward clutch 41c may be calculated on the basis of a clutch input torque (engine load), a difference in rotational speed (slipping rotational speed), and the like. Furthermore, a temperature sensor that measures the temperature of forward clutch 41c may be provided, to measure the temperature of the forward clutch 41c.

Furthermore, in step S301, the predetermined value compared with the temperature of forward clutch 41c is a threshold value used to determine whether it is required to increase the oil flow rate by operating electric oil pump 7, and the predetermined value is set in advance based on a temperature at which the temperature of forward clutch 41c may exceed an allowable temperature unless the oil flow rate is increased by electric oil pump 7.

When the temperature of forward clutch 41c is the predetermined value or higher, the request for compensating the insufficient oil flow rate by electric oil pump 7 is generated. Thus, the routine of control device 8 proceeds to step S308, and it is determined that the start-up request for electric oil pump 7 is established.

In contrast, when the temperature of forward clutch 41c is lower than the predetermined value, no start-up request for electric oil pump 7 is generated based on the temperature of forward clutch 41c. However, the routine of control device 8 proceeds to step S302 and thereafter, to determine whether a start-up request is established is based on the other conditions.

In step S302, control device 8 determines whether forward clutch 41c is in the slipping state based on the difference in rotational speed between the input side and the output side of forward clutch 41c, that is, the slipping rotational speed.

Then, when forward clutch 41c is not in the slipping state, that is, when forward clutch 41c is in the disengaged state or the completely engaged state with no difference in rotational speed, there is no need to increase the oil flow rate for coping with the heat generated by the slip. Thus, the routine of control device 8 proceeds to step S307, and it is determined that the start-up request for electric oil pump 7 is not established.

In contrast, when forward clutch 41c is in the slipping state, there is a possibility that it may be required to increase the oil flow rate to cope with the heat generated by the slip, and hence the routine of control device 8 proceeds to step S303.

In step S303, control device 8 determines whether a road, on which the vehicle travels, has a steep upward slope, a gradient of which is greater than a predetermined value, and the vehicle brake is in an off state.

In such a condition, it is expected that the load torque generated when forward clutch 41c is engaged to start up the vehicle may be increased, and the heat generation amount in the engaging process of forward clutch 41c may be increased. Thus, the routine of control device 8 proceeds to step S308, and it is determined that the start-up request for electric oil pump 7 is established.

When it is determined, in step S303, that the gradient condition and/or the brake condition is not satisfied, the routine of control device 8 proceeds to step S304, to determine whether a state, in which an accelerator opening degree ACC is a predetermined value or more and the brake is operated, continues for a predetermined time or more.

When the conditions of step S304 are satisfied, the vehicle is assumed to be in a situation in which an accelerator is stepped on while a brake pedal is stepped on, and then, the brake is released with an output of engine 1 increased, to suddenly start the vehicle. In this case, it is expected that the input torque of forward clutch 41c may be increased, and the heat generation amount in the engaging process of forward clutch 41c may be increased. For this reason, the routine of control device 8 proceeds to step S308, and it is determined that the start-up request for electric oil pump 7 is established.

When it is determined, in step S304, that the vehicle is not in the suddenly started state, the routine of control device 8 proceeds to step S305, to determine whether a state, in which the input torque of forward clutch 41c exceeds a predetermined value and the vehicle speed is a predetermined value or less, continues for a predetermined time or more.

This is a situation in which the torque (start-up load) for starting up the vehicle is increased due to an increased up-hill grade or an increased carrying load, or the like. In this case, it is expected that the input torque and the load torque of forward clutch 41c may be increased, and the heat generation amount in the engaging process of forward clutch 41c may be increased. For this reason, the routine of control device 8 proceeds to step S308, and it is determined that the start-up request for electric oil pump 7 is established.

When it is determined, in step S305, that the start-up load is not large, the routine of control device 8 proceeds to step S306, to determine whether the transmission gear ratio of continuously variable transmission mechanism 42 is a predetermined value or less and the vehicle speed VSP is a predetermined value or less.

The situation in which the conditions of step S306 are satisfied is a state in which the vehicle starts in a second gear position in a stepped variable transmission. In this state, it is expected that the load torque may be increased, and the heat generation amount in the engaging process of forward clutch 41c may be increased. For this reason, the routine of control device 8 proceeds to step S308, and it is determined that the start-up request for electric oil pump 7 is established.

When it is determined, in step S306, that the vehicle is not in the starting state in the second gear position, control device 8 determines that the heat generation amount is not large to an extent requiring the increase in oil flow rate even when forward clutch 41c is in the slipping state. Thus, the routine of control device 8 proceeds to step S307, and it is determined that the start-up request for electric oil pump 7 is not established.

When it is determined that the start-up request for electric oil pump 7 is established in step S307 and the start-up request is not established in step S308, control device 8 confirms the determination result in step S309.

The invention is not limited to the determination on the heat generation amount exemplified in step S303 to step S306, and the heat generation amount of forward clutch 41c may be estimated by the other processes.

Furthermore, in the determination process for the heat generation amount exemplified in step S303 to step S306, a heat generation determination may be made in a disengaging process in a deceleration state, in addition to the process of starting up electric oil pump 7 when heat is generated due to start acceleration.

As described above, control device 8 checks the determination result as to the establishment of the start-up request for electric oil pump 7, in step S204 of the flowchart of FIG. 3. When the start-up request for electric oil pump 7 is not established, the routine of control device 8 proceeds to step S207, to stop electric oil pump 7.

Even when electric oil pump 7 is stopped in step S207, mechanical oil pump 5 is driven and a necessary amount of oil is supplied to forward-reverse switching mechanism 41 and continuously variable transmission mechanism 42 through pressure adjustment mechanism 6.

On the other hand, when it is determined, in step S204, that the start-up request for electric oil pump 7 is established, the routine of control device 8 proceeds to step S205, to set the target rotational speed rpm, which has been set in step S203, as the instruction value in the drive control for electric oil pump 7. Furthermore, in step S206, control device 8 drives electric oil pump 7 based on the instruction of the target rotational speed rpm.

That is, when the heat generation amount of forward clutch 41c is increased and the heat generation amount tends to increase in the slipping state of forward clutch 41c, the oil is also supplied from electric oil pump 7 to forward clutch 41c in addition to the oil supplied from mechanical oil pump 5 to forward clutch 41c. Accordingly, the cooling performance for forward clutch 41c is improved by the oil, and hence an increase in temperature of forward clutch 41c is reduced.

As described above, when the heat generation amount is increased in the slipping state of forward clutch 41c when forward-reverse switching mechanism 41 is in the drive state, electric oil pump 7 is driven so as to increase the oil flow rate.

Figure 5A:
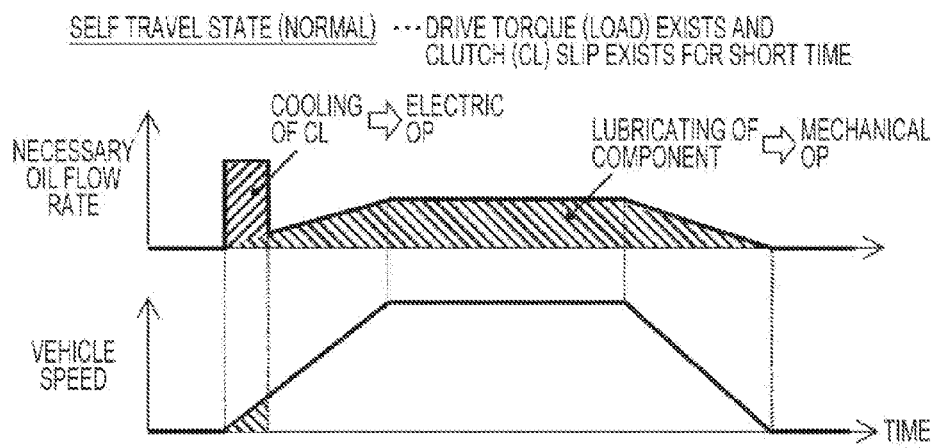
FIGS. 5A and 5B are timing diagrams schematically illustrating a difference in control pattern of the electric oil pump between the drive state and the non-drive state of the power transmission device according to the embodiment of the invention.

Since mechanical oil pump 5 is driven by engine 1, a discharge flow rate is small when the pump rotational speed is low during the start-up of the vehicle, and the discharge flow rate of mechanical oil pump 5 increases as the vehicle speed increases, as illustrated in FIG. 5A.

In contrast, forward clutch 41c generates heat in the slipping state during the engaging process for the start-up. Here, in the heat generation condition of forward clutch 41c is a condition in which the vehicle speed is low at start acceleration, and forward clutch 41c may not be sufficiently cooled down by the discharge amount of mechanical oil pump 5.

Therefore, as illustrated in FIG. 5A, the discharge amount of electric oil pump 7 is added to the discharge amount of mechanical oil pump 5, and the oil amount necessary for cooling forward clutch 41c is ensured by the total amount of both pumps 5 and 7.

The timing diagram of FIG. 6A illustrates an example of the control pattern of electric oil pump 7 in the drive state of forward-reverse switching mechanism 41.

In the timing diagram of FIG. 6A, a shift range is switched from a neutral range to a drive range at the time t1, and an engaging operation of forward clutch 41c is performed.

At the time t2, an instruction for activating electric oil pump 7 is generated based on a timing at which the input torque of forward clutch 41c exceeds a predetermined value with an accelerator opening operation. Then, at the time t3, electric oil pump 7 is stopped when forward clutch 41c is completely engaged.

At the time t4, forward clutch 41c shifts to the slipping state due to deceleration, and the forward-reverse switching mechanism is driven from the axle side, and thus, a difference in rotation of forward clutch 41c increases. Accordingly, electric oil pump 7 is activated again. Then, at the time t5, electric oil pump 7 is stopped due to convergence of the deceleration.

Moreover, at the time t6, electric oil pump 7 is activated in order to cope with an increase in input torque caused by stepping on of the accelerator in the slipping state. Then, at the time t7, electric oil pump 7 is stopped when the accelerator is released.

The processes illustrated in the flowcharts of FIGS. 3 and 4 are processes performed in a case in which control device 8 determines that forward-reverse switching mechanism 41 is in the drive state in step S102 of the flowchart of FIG. 2 and the routine proceeds to step S114. Then, when it is determined that forward-reverse switching mechanism 41 is in the non-drive state in step S102, the routine of control device 8 proceeds to step S103 and thereafter.

The non-drive state of forward-reverse switching mechanism 41, at which the routine proceeds to step S103 and thereafter, is a state in which forward-reverse switching mechanism 41 is in a non-operated state and motor generator 3 is in a non-operated state, that is, motor generator 3 does not generate a torque.

In step S103, control device 8 reads the measured value of an oil temperature TO. In step S104, control device 8 calculates a target rotational speed rpm of electric oil pump 7 based on the oil temperature TO (° C.).

In control device 8, a conversion table or a function representing a correlation between the oil temperature TO and the target rotational speed rpm used in the non-drive state of forward-reverse switching mechanism 41 is set. Thus, control device 8 calculates the target rotational speed rpm corresponding to the oil temperature TO at that time, according to the correlation.

The target rotational speed rpm in the non-drive state is set to a higher rotational speed as the oil temperature TO increases, similarly to the target rotational speed rpm in the drive state, so that the cooling performance is improved when the oil temperature is high, to reduce an increase in oil temperature TO.

Here, in the non-drive state, since the engaging torque of forward clutch 41c is not generated and the input torque of forward-reverse switching mechanism 41 is small, the heat generation amount of forward clutch 41c becomes smaller than that in the drive state. Therefore, the target rotational speed rpm in the non-drive state is set to a value less than that in the drive state at the same oil temperature TO.

Figure 7:
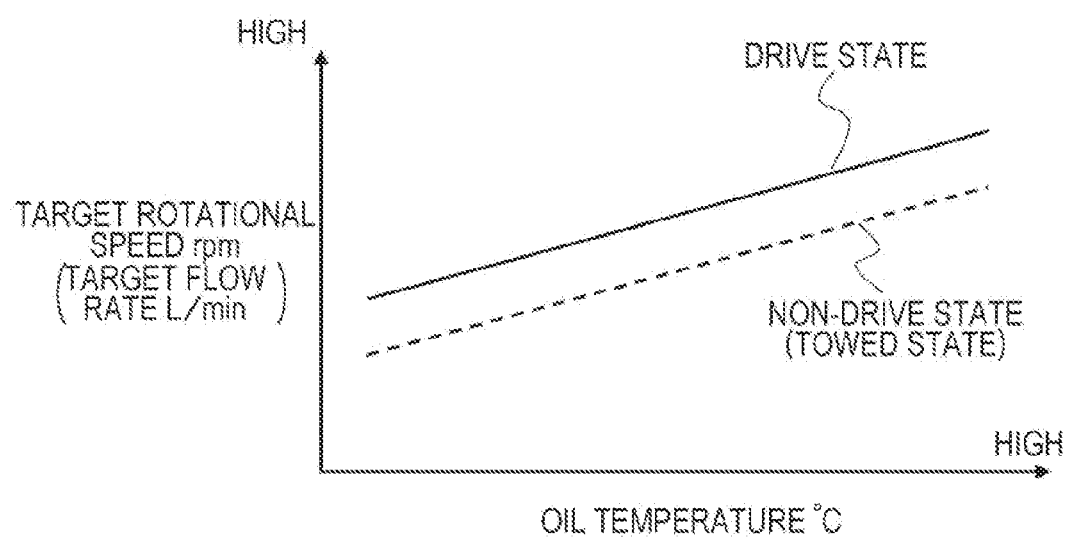
FIG. 7 is a diagram illustrating a target flow rate of the electric oil pump in the drive state and the non-drive state of the power transmission device according to the embodiment of the invention.

FIG. 7 is a diagram illustrating the correlations between the oil temperature TO and the target rotational speed rpm in the drive state and the non-drive state. In the drive state and the non-drive state, the target rotational speed rpm is increased as the oil temperature TO increases. However, when compared at the same oil temperature TO, the target rotational speed rpm applied to the drive state is set to be higher than the target rotational speed rpm applied to the non-drive state.

The target rotational speed rpm may be set to a value in which at least the flow rate necessary for the lubrication and the cooling may be ensured, and is not limited to the characteristic illustrated in FIG. 7. Furthermore, the process of changing the target rotational speed rpm based on the oil temperature TO may be omitted, and electric oil pump 7 may be driven based on a predetermined constant target rotational speed rpm.

In step S105, control device 8 determines whether the vehicle speed VSP is a predetermined value (1) or more.

The predetermined value (1) of step S105 is a value used to determine whether the vehicle travels by being towed by another vehicle (towed state). The predetermined value (1) is set in advance so that it can be estimated that the vehicle may be in the towed state when the vehicle speed VSP is the predetermined value (1) or more in the non-drive state of forward-reverse switching mechanism 41.

Here, when the vehicle is stopped in the neutral state, control device 8 determines that the vehicle speed VSP is lower than the predetermined value (1), and the routine proceeds to step S110, to stop electric oil pump 7.

When the vehicle is stopped in the neutral range or at the low speed immediately before the vehicle is stopped, the increase in temperature of forward clutch 41c or a running out of oil can be reduced even when mechanical oil pump 5 is stopped, and hence electric oil pump 7 is stopped to reduce unnecessary electric power consumption.

When forward-reverse switching mechanism 41 is in the non-drive state while engine 1 is operated, mechanical oil pump 5 is driven by engine 1, and oil is supplied from mechanical oil pump 5 to forward-reverse switching mechanism 41 for the lubricating purpose and the cooling purpose. For this reason, there is no need to drive electric oil pump 7.

In contrast, when forward-reverse switching mechanism 41 is in the non-drive state while engine 1 is stopped, mechanical oil pump 5 is stopped and hence oil is not supplied from mechanical oil pump 5 to forward-reverse switching mechanism 41. However, if the vehicle is stopped or is running at a low speed, the input torque and the slipping rotational speed of forward clutch 41c are small and the heat generation amount is small even when forward-reverse switching mechanism 41 is rotationally driven from the axle side. Accordingly, it is possible to sufficiently reduce the overheating or the running out of lubrication oil of forward-reverse switching mechanism 41 even when electric oil pump 7 is not driven.

Thus, when control device 8 determines the vehicle speed VSP is lower than the predetermined value (1) in step S105, the routine of control device 8 proceeds to step S110, to stop electric oil pump 7.

On the other hand, when the vehicle speed VSP is the predetermined value (1) or more, there is a possibility that the vehicle may be towed while the operations of engine 1 and motor generator 3 are stopped (mechanical oil pump 5 is stopped). Furthermore, since the vehicle speed is high, it may be expected that the heat generation amount of forward-reverse switching mechanism 41 is increased.

That is, the running state in which no drive force generated by engine 1 or motor generator 3 is transmitted to the axle, includes a coasting running and a towed running. Even in the running state in which no drive force is transmitted to the axle, heat is generated since forward-reverse switching mechanism 41 is driven from the axle side. Thus, the heat generation amount is increased, as the vehicle speed increases and the rotation of forward-reverse switching mechanism 41 increases.

Therefore, when it is determined that the vehicle speed VSP is the predetermined value (1) or more in step S105, the routine of control device 8 proceeds to step S106, to drive electric oil pump 7 based on the target rotational speed rpm set in step S104, so that oil discharged from electric oil pump 7 is supplied to forward-reverse switching mechanism 41 for the lubricating purpose and the cooling purpose.

Furthermore, in step S106, control device 8 sets a flag for determining that electric oil pump 7 is driven.

Figure 5B:
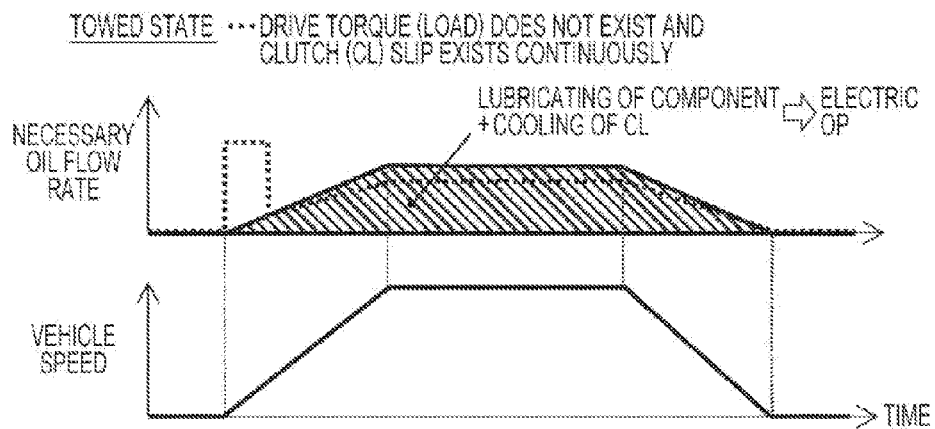

In general, since a vehicle is towed with the operation of engine 1 stopped, mechanical oil pump 5 is stopped. However, since the rotation drive torque is transmitted from the axle to forward-reverse switching mechanism 41, heat is generated in forward-reverse switching mechanism 41. In such a towed state, oil is supplied from electric oil pump 7 to forward-reverse switching mechanism 41 for the lubricating purpose and the cooling purpose as illustrated in FIG. 5B. Accordingly, it is possible to reduce the overheating of forward-reverse switching mechanism 41 in the towed state and the running out of the lubrication oil.

Furthermore, since the target rotational speed rpm of electric oil pump 7 is set according to the oil temperature TO, it is possible to reduce a problem of excessive oil being discharged from electric oil pump 7 while the heat generation amount is low. In other words, it is possible to reduce unnecessary electric power consumption since engine 1 is stopped and the battery is not charged.

The target rotational speed rpm of electric oil pump 7 may be set according to the oil temperature TO and the vehicle speed VSP. In this case, the target rotational speed rpm is set to be greater as the oil temperature TO increases even in the same vehicle speed VSP. Furthermore, the target rotational speed rpm is set to be greater as the vehicle speed VSP increases even in the same oil temperature TO.

The target rotational speed rpm of electric oil pump 7 may be set based on the vehicle speed VSP instead of the oil temperature TO. In this case, the target rotational speed rpm is set to be greater as the vehicle speed VSP increases.

In the towed state in which forward-reverse switching mechanism 41 is rotationally driven from the axle side, the difference in rotation between the input side and the output side of forward clutch 41c increases as the vehicle speed increases, and the heat generation amount is increased as the difference in rotation increases. Accordingly, the target rotational speed rpm is set to increase as the vehicle speed VSP increases.

Furthermore, the state in which forward-reverse switching mechanism 41 is in the non-drive state and the vehicle speed VSP is the predetermined value (1) or more, includes the coasting running, as described above. In this case, since mechanical oil pump 5 is in the drive state and supplies oil to forward-reverse switching mechanism 41, the oil temperature TO is reduced to be low. Thus, the target rotational speed rpm depending on the oil temperature TO is reduced to be low, or an instruction to stop electric oil pump 7 is made.

In step S107, control device 8 determines whether forward-reverse switching mechanism 41 has been switched from the non-drive state to the drive state. In other words, control device 8 determines whether the neutral range has been switched to the drive range.

Here, when forward-reverse switching mechanism 41 has been switched to the drive state, the vehicle is not in the towed state and mechanical oil pump 5 is driven. Thus, the routine of control device 8 proceeds to step S114, to perform a control in which oil is supplied from electric oil pump 7 in response to the heat generated in the engaging process of forward clutch 41c.

In contrast, when forward-reverse switching mechanism 41 is in the non-drive state, the routine of control device 8 proceeds to step S108, to determine whether an operation time of electric oil pump 7 is a predetermined value (1) or more.

The predetermined value (1) of step S108 indicates a maximum time for which the continuous operation of electric oil pump 7 can be allowed, and is set in advance based on the battery consumption with respect to the operation time or an increase in temperature of electric oil pump 7 with respect to the operation time.

Therefore, when the operation time of electric oil pump 7 becomes the predetermined value (1) or more, the routine of control device 8 proceeds to step S110, to stop electric oil pump 7 so that the battery consumption or an increase in the temperature of the drive motor is reduced.

In contrast, when control device 8 determines that the operation time of electric oil pump 7 is less than the predetermined value (1) in step S108, the routine of control device 8 proceeds to step S109, to determine whether the vehicle speed VSP is lower than a predetermined value (2).

The predetermined value (2) of step S109 is set to be lower than the predetermined value (1) of step S105, and hence the hunting in the operation and the stop of electric oil pump 7 based on the vehicle speed can be reduced.

When the vehicle speed VSP decreases so as to be lower than the predetermined value (2) while electric oil pump 7 is driven, that is, when the vehicle is temporarily stopped at an intersection point in the towed state or the vehicle is parked due to the arrival to the target place, the heat generation amount of forward-reverse switching mechanism 41 decreases. Accordingly, even when mechanical oil pump 5 is in the stop state, the supply of the oil from electric oil pump 7 is not needed. Thus, the routine of control device 8 proceeds to step S110, to stop electric oil pump 7.

In contrast, when the vehicle speed VSP is maintained at the predetermined value (2) or more, control device 8 determines that oil needs to be supplied from electric oil pump 7 due to the heat generated by forward-reverse switching mechanism 41 rotationally driven from the axle side. Then, the routine of control device 8 returns to step S106, to continuously drive electric oil pump 7.

When the routine of control device 8 proceeds to step S110 and electric oil pump 7 is stopped, the routine proceeds to step S111, to determine whether the flag has been set.

Then, when the flag has been set, that is, when there is a history that although electric oil pump 7 was driven in the non-drive state of forward-reverse switching mechanism 41, electric oil pump 7 was stopped thereafter by the determination on the vehicle speed in step S109 or by the determination on the operation time in step S108, the routine of control device 8 proceeds to step S112.

In step S112, control device 8 determines whether a stopping time of electric oil pump 7 is a predetermined value (2) or more.

Here, when the stopping time of electric oil pump 7 is less than the predetermined value (2), the routine of control device 8 returns to step S110, to maintain the stop state. In contrast, when the stopping time is the predetermined value (2) or more, the routine of control device 8 proceeds to step S113, to reset the flag to be zero.

When the flag is reset in step S113, the routine of control device 8 returns to step S101. Here, when the towed state continues, electric oil pump 7 is driven again.

Thus, electric oil pump 7 is intermittently driven in the continuing towed state, so that an increase in temperature of forward-reverse switching mechanism 41 and electric oil pump 7 can be reduced while reducing the battery consumption.

In order to reduce the battery consumption due to the driving of electric oil pump 7 in the towed state, a regeneration operation of converting the drive force in the towed state into electric power may be performed, and the regenerated electric power may be charged into a battery.

Furthermore, when engine 1 may be automatically started up in the towed state and an alternator may be driven by engine 1, to thereby charge the battery by the generated power.

Moreover, the regeneration and the operation of engine 1 may be performed when the battery is consumed by the driving of electric oil pump 7.

Here, the battery consumption may be determined based on the operation time of electric oil pump 7 as described above. Furthermore, the battery consumption may be determined based on the battery voltage and the electric power consumption in electric oil pump 7.

Furthermore, the electric power consumption of electric oil pump 7 increases as the oil temperature decreases and the viscosity of oil increases. For this reason, by changing the predetermined value (1) of the operation time in step S108 to the shorter time as the oil temperature becomes lower, it is possible to continuously drive electric oil pump 7 as long as possible while reducing the battery consumption.

FIG. 6B illustrates the relationship among the operation states involved with the vehicle speed and the like in the non-drive state of forward-reverse switching mechanism 41, and the on/off state of electric oil pump 7 and the rotational speed of the electric oil pump 7 in the on state.

In FIG. 6B, electric oil pump 7 starts to be driven at the time t8 in which the vehicle speed VSP increases by the towed operation, in other words, the time in which a difference in rotation between the input side and the output side of forward clutch 41*c* is generated.

Subsequently, electric oil pump 7 is continuously driven until the time t9 in which the vehicle is stopped. Here, the rotational speed of the pump is controlled as below. That is, when the oil temperature increases in accordance with an increase in heat generation amount caused by an increase in vehicle speed, the rotational speed of electric oil pump 7 is increased. In contrast, when the oil temperature decreases in accordance with a decrease in heat generation amount caused by a decrease in vehicle speed, the rotational speed of electric oil pump 7 is decreased.

Here, electric oil pump 7 may be driven at a constant rotational speed. However, when the rotational speed of the pump is changed according to the vehicle speed or the oil temperature, the electric power consumption of electric oil pump 7 may be decreased as much as possible while reducing an increase in the temperature of forward-reverse switching mechanism 41.

That is, in FIG. 6B, even from the time t10 to the time t11, electric oil pump 7 is driven since the vehicle travels in the towed state. However, since the vehicle travels at the low vehicle speed compared to the travel from the time t8 to the time t9, the rotational speed of electric oil pump 7 is reduced to be small, and hence unnecessary electric power consumption is reduced.

In the example of the drive control of electric oil pump 7 illustrated in the flowchart of FIG. 2, the on and off states of electric oil pump 7 in the non-drive state of forward-reverse switching mechanism 41 are changed according to the vehicle speed VSP. However, control device 8 may operate electric oil pump 7 by determining a heat generating state of forward-reverse switching mechanism 41.

Figure 8:
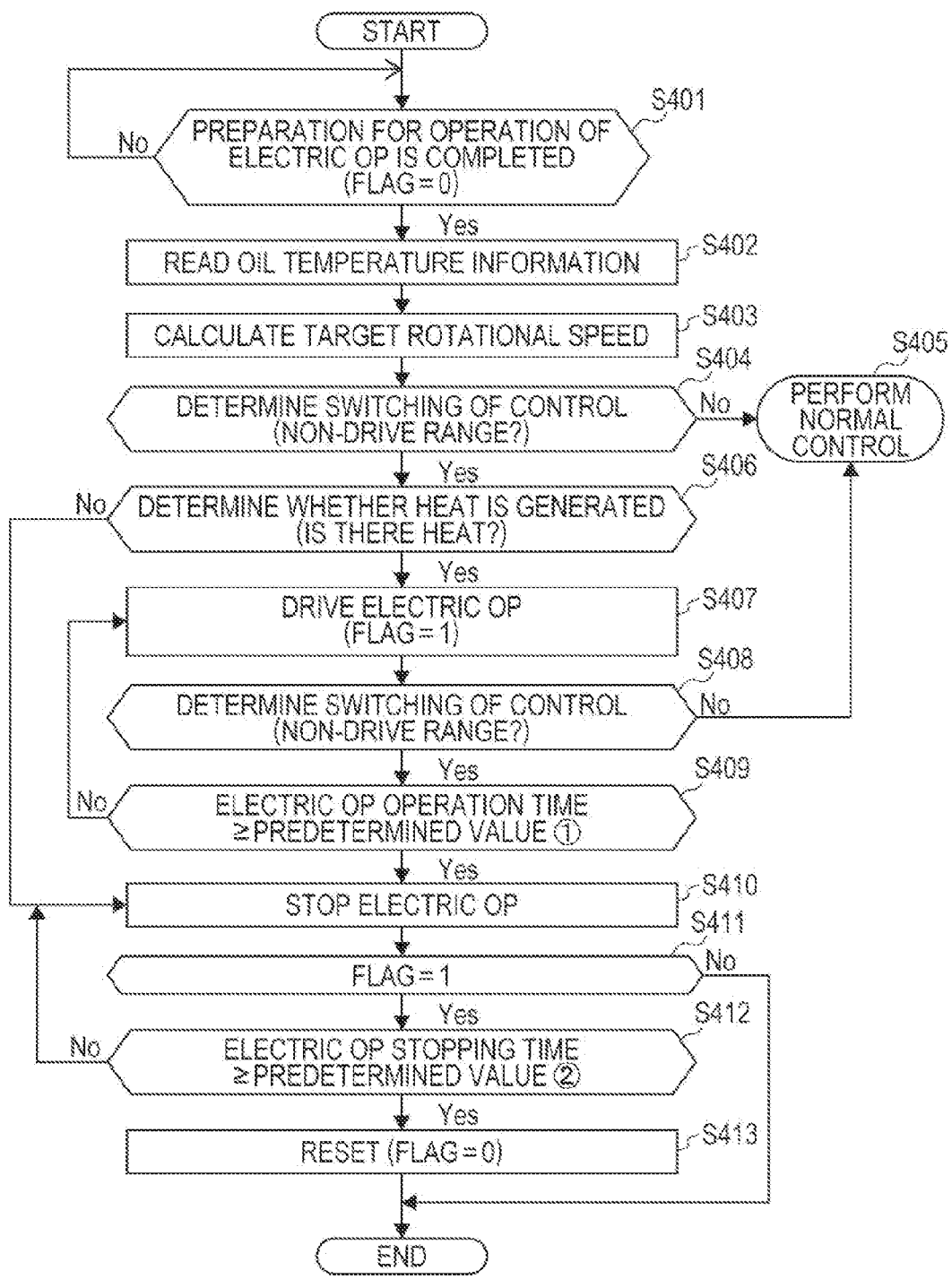
FIG. 8 is a flowchart illustrating a control of the electric oil pump in the non-drive state of the power transmission device according to the embodiment of the invention.

The flowchart of FIG. 8 illustrates an example of a control in which control device 8 operates electric oil pump 7 in the non-drive state of forward-reverse switching mechanism 41, and is performed instead of the routine illustrated in the flowchart of FIG. 2. Here, control device 8 operates electric oil pump 7 by determining the heat generating state of forward-reverse switching mechanism 41.

In step S401 of the flowchart of FIG. 8, control device 8 determines whether the preparation for the operation of electric oil pump 7 has been completed, similarly to step S101.

Then, when the preparation for the operation has been completed, the routine of control device 8 proceeds to step S402, to read an oil temperature TO. In next step S403, control device 8 calculates a target rotational speed rpm of electric oil pump 7 based on the oil temperature TO (° C.), similarly to step S104.

Next, in step S404, control device 8 determines whether forward-reverse switching mechanism 41 is in the non-drive state, similarly to step S102.

When forward-reverse switching mechanism 41 is in the drive state, the routine of control device 8 proceeds to step S405, to control the operation of electric oil pump 7 in accordance with the flowcharts of FIGS. 3 and 4.

In contrast, when forward-reverse switching mechanism 41 is in the non-drive state, the routine of control device 8 proceeds to step S406, to determine whether forward-reverse switching mechanism 41 is in a heat generating state based on, for example, the oil temperature TO.

Here, control device 8 may store an initial value of the oil temperature TO in the non-drive state, and determine that forward-reverse switching mechanism 41 is in the heat generating state (temperature increasing state) when the oil temperature TO increases from the initial temperature by a predetermined value or more.

Furthermore, control device 8 may set in advance a temperature that exceeds the oil temperature TO due to the heat of forward-reverse switching mechanism 41 as a threshold temperature, and determine that forward-reverse switching mechanism 41 is in the heat generating state when the oil temperature TO exceeds the threshold temperature.

In step S406, control device 8 may determine the heat generating state based on the oil temperature TO. Alternatively, control device 8 may detect the heat generating state of forward-reverse switching mechanism 41 by measuring a representative temperature of forward-reverse switching mechanism 41 or a temperature involved with the temperature of forward-reverse switching mechanism 41, such as the temperature of forward clutch 41c, the temperature of a bearing of forward-reverse switching mechanism 41, and the temperature of a coil of motor generator 3, and by determining whether the temperature increases.

When control device 8 determines that forward-reverse switching mechanism 41 is in the heat generating state in step S406, the routine of control device 8 proceeds to step S407, to drive electric oil pump 7 based on the target rotational speed rpm set in step S403.

Next, in step S408, control device 8 determines whether forward-reverse switching mechanism 41 has been switched to the drive state. When the forward-reverse switching mechanism 41 has been switched to the drive state, the routine proceeds to step S405.

In contrast, when the non-drive state of the forward-reverse switching mechanism continues, the routine of control device 8 proceeds to step S409, to determine whether the operation time of electric oil pump 7 is a predetermined value (1) or more, similarly to step S108.

Then, when the operation time is less than the predetermined value (1), the routine of control device 8 returns to step S407, to continuously drive electric oil pump 7. In contrast, when the operation time is the predetermined value (1) or more, the routine of control device 8 proceeds to step S410, to stop electric oil pump 7, to thereby reduce the battery consumption and the increase in temperature of electric oil pump 7.

When the routine of control device 8 proceeds to step S410 and electric oil pump 7 is stopped, the routine proceeds to step S411, to determine whether a flag has been set.

Then, when the flag has been set, that is, electric oil pump 7 was driven in the non-drive state of forward-reverse switching mechanism 41, the routine of control device 8 proceeds to step S412.

In step S412, control device 8 determines whether a stopping time of electric oil pump 7 is a predetermined value (2) or more.

Here, when the stopping time of electric oil pump 7 is less than the predetermined value (2), the routine of control device 8 returns to step S410, to maintain the stop state. In contrast, when the stopping time is the predetermined value (2) or more, the routine of control device 8 proceeds to step S413, to reset the flag to be zero.

Since the flag is reset to be zero, when the routine of control device 8 returns to step S401 and if the towed state continues, then electric oil pump 7 is driven again, so that electric oil pump 7 can be intermittently driven in the continuing towed state. Accordingly, it is possible to reduce an increase in temperature of forward-reverse switching mechanism 41 and electric oil pump 7 while reducing the electric power consumption (battery consumption).

Although the invention has been described in detail with reference to the preferred embodiment, it is apparent that the invention may be modified into various forms by one skilled in the art based on the technical spirit and teachings of the invention.

For example, in the above-described embodiment, the control device for the vehicular electric oil pump according to the invention is applied to the hybrid vehicle. However, the control device for the vehicular electric oil pump may be applied to a vehicle only including an engine as a power source, that is, a vehicle not including first clutch 2 and motor generator 3 illustrated in FIG. 1.

Furthermore, the stop engine 1 and motor generator 3 may be determined based on the determination in step S102 of the flowchart of FIG. 2 and step S404 of the flowchart of FIG. 8, and the process in and after step S103 or step S406 may be performed with engine 1 and motor generator 3 stopped.

REFERENCE SYMBOL LIST

1 Engine
2 First clutch
3 Motor generator
4 Power transmission device
5 Mechanical oil pump
7 Electric oil pump
8 Control device

The invention claimed is:

1. A control device for a vehicular electric oil pump that supplies oil to a power transmission device transmitting power to an axle,
wherein an operation time of the vehicular electric oil pump is shortened as an oil temperature decreases when the vehicular electric oil pump is operated while a vehicle is in a towed state.

2. The control device for the vehicular electric oil pump, according to claim 1,
wherein an operation of the vehicular electric oil pump is stopped according to a consumption state of a battery provided as a power supply of the vehicular electric oil pump when the vehicular electric oil pump is operated while the vehicle is in the towed state.

3. The control device for the vehicular electric oil pump, according to claim 1,
wherein a rotational speed of the vehicular electric oil pump is increased as the oil temperature increases when the vehicular electric oil pump is operated while the vehicle is in the towed state.

4. The control device for the vehicular electric oil pump, according to claim 1,
wherein the power transmission device transmits an output of an engine to the axle,
wherein the vehicle is provided with a mechanical oil pump that is driven by the engine and supplies oil to the power transmission device in parallel to the electric oil pump.

5. The control device for the vehicular electric oil pump, according to claim 1,
wherein the vehicular electric oil pump is operated when a vehicle speed exceeds a predetermined value while the vehicle is in the towed state.

6. The control device for the vehicular electric oil pump, according to claim 1, wherein the vehicular electric oil pump is operated, when the vehicle is in the towed state and the power transmission device increases in temperature by a predetermined value or more.

7. The control device for the vehicular electric oil pump, according to claim 1,
wherein the power transmission device transmits a drive force generated by an engine to the axle,
wherein the vehicle is provided with a mechanical oil pump that is driven by the engine and supplies oil to the power transmission device in parallel to the electric oil pump,
wherein the electric oil pump is operated when a friction-engagement component included in the power transmission device increases in temperature by a predetermined value or more while the vehicle is in the towed state.

8. A control method for a vehicular electric oil pump that supplies oil to a power transmission device transmitting power to an axle, comprising the steps of:
determining whether a vehicle is in a towed state; and
shortening an operation time of the vehicular electric oil pump as an oil temperature decreases when the vehicular electric oil pump is operated while the vehicle is in the towed state.

9. The control method for the vehicular electric oil pump, according to claim 8, further comprising the step of:
stopping an operation of the vehicular electric oil pump according to a consumption state of a battery provided as a power supply of the vehicular electric oil pump when the vehicular electric oil pump is operated while the vehicle is in the towed state.

10. The control method for the vehicular electric oil pump, according to claim 8, further comprising the step of:
increasing a rotational speed of the vehicular electric oil pump as the oil temperature increases when the vehicular electric oil pump is operated while the vehicle is in the towed state.

11. The control method for the vehicular electric oil pump, according to claim 8,
wherein the power transmission device transmits a drive force generated by an engine to the axle, and the vehicle is provided with a mechanical oil pump that is driven by the engine and supplies oil to the power transmission device in parallel to the electric oil pump;
the method further comprising the steps of:
determining whether a friction-engagement component included in the power transmission device increases in temperature by a predetermined value or more while the vehicle is in the towed state; and
operating the electric oil pump when the friction-engagement component increases in temperature by the predetermined value or more while the vehicle is in the towed state.

\* \* \* \* \*